United States Patent Office 3,310,605
Patented Mar. 21, 1967

3,310,605
TWO STEP GRAFTING USING TRAPPER RADICAL SYSTEM
Nelson S. Marans, Silver Spring, and Forrest A. Wessells, Baltimore, Md., assignors to W. R. Grace & Co., New York, N.Y., a corporation of Connecticut
No Drawing. Filed Aug. 2, 1965, Ser. No. 476,726
8 Claims. (Cl. 260—877)

This application is a continuation-in-part of an earlier filed application, Ser. No. 152,648 filed Nov. 15, 1961, now abandoned.

The present invention relates to the grafting of crystalline polymers such as crystalline polyethylene, polypropylene and poly-4-methyl-1-pentene, and more specifically to a novel grafted polymeric structure which is selectively grafted with a plurality of monomeric graftable specie.

It has been found that highly crystalline polymers may be advantageously grafted with unsaturated monomers by a process which involves first subjecting a highly crystalline substrate polymer to high energy radiation to induce the formation of trapped free radical or peroxidic grafting sites therein, and subsequently during the life of the grafting sites, contacting the activated substrate polymer with a graftable monomer which is characterized by the unsaturated grouping $CH_2=C<$. Such a grafting process is fully disclosed in a co-pending application Ser. No. 95,807, filed Mar. 15, 1961 by N. S. Marans now abandoned.

In this prior co-pending application a graftable monomer or a mixture of graftable monomers is imbibed throughout the substrate, and a uniformly or homogeneously grafted polymer is obtained. The addition of such grafts serve to induce cross-linking in the substrate polymer thereby increasing its thermoset characteristics. Furthermore, grafting eliminates potential oxidation sites in the polymer which increases the stability of the polymer.

We have found that a modification of this basic grafting technique makes possible novel and useful grafted polymeric structures which possess specific utility. In the novel structure, contemplated herein a set of grafts of one variety of monomer is distributed homogeneously throughout a polymeric material, and then a second set of grafts of another variety of monomer are selectively positioned near the surface of the same polymer. Such a "dual" grafted polymeric structure possess characteristics which make it useful for applications where extreme serviceability and strength is desired along with interior flexibility and toughness. These characteristics are desired for applications such as brush brittles, flexing film which is subjected to abrasive forces, molded objects exposed to extreme corrosive conditions, and so forth.

It is therefore an object of the present invention to provide a grafted polymeric structure which possesses a homogeneous graft of one monomer and a surface graft of a second monomer.

It is another object of the present invention to provide a method by which a surface grafted derivative of a homogeneously grafted polymer may be conveniently obtained.

These and still further objects of the present invention will become readily apparent to one skilled in the art of the following detailed description and specific examples.

Broadly, the present invention contemplates a polymeric structure which is homogeneously grafted throughout with a first monomer and is grafted on the surface with a second monomer.

More specifically the present invention envisions an essentially crystalline polymeric substrate such as crystalline polyethylene, polypropylene and, poly-4-methyl-1-pentene which is firstly grafted throughout with a homogeneous grafting monomer such as acrylonitrile, 2-vinylpyridine, and vinyl acetate, and is additionally grafted at its surface with a surface grafting monomer such as methyl acrylate, ethyl acrylate, ethyl methacylate, and vinylpyrrolidone.

The method by which we obtain our novel grafted polymer involves first subjecting a crystalline polymeric substrate to a high energy ionizing radiation dosage ranging from about 0.1 to about 10 megarads in the absence of oxygen, subsequently contacting the irradiated substrate with a homogeneously grafting monomer, and finally before the expiration of the life of the grafting sites, contacting the substrate with a surface grafting monomer. Alternatively, the surface grafting monomer may be applied before application of the homogeneous grafting monomer. The only limitation regarding the application of the monomers is that the application must take place during the active life of the grafting sites induced in the substrate polymer by the irradiation.

During contact with the homogeneous grafting monomer the temperature of the system is preferably maintained at about 60 to 100° C. to obtain rapid and substantial incorporation of the monomer into the substrate polymer. The temperature at which the surface grafting monomer may be in the order of 60 to 100° C., however, lower temperatures in the order of room temperature will suffice.

The time period for which a substrate polymer is contacted with the monomers depends on the amount or depth of graft which is desired in the substrate. In general the contact time for surface grafting monomers is shorter than for homogeneously grafting monomers since only a surface graft is desired. While surface grafting monomers disclosed herein do not tend to be deeply absorbed into the substrate, it is obvious that extended soaking of the activated substrate in the monomer will produce a relatively homogeneous graft, particularly when thin sections of substrate are being grafted. The time required to obtain the desired graft also depends on the diffusivity of the particular monomer employed and also by the receptiveness of the polymeric substrate being used. Generally speaking an immersion period of a few seconds to a few minutes is sufficient to produce a useful surface graft. Homogeneous grafts take longer and immersion periods up to several hours long may be used to advantage. As a general rule it is found that the specific time period required to obtain a desired structure will have to be determined empirically for each system wherein factors such as depth of surface graft, amount of homogeneous graft, amount of radiation, and so forth are taken under consideration.

Between application of the respective homogeneous and surface grafting monomers, excess monomer from the previous grafting step is preferably removed by washing the grafted substrate with a suitable solvent such as benzene. Such a washing procedure more closely governs the amount of grafting taking place in a given procedure and prevents the contamination of the respective monomer baths.

While the above general description describes a case where only one homogeneous grafting monomer and one surface grafting monomer is used it should be understood that the present invention may be practiced using more than one variety of each type of monomer. For example, a substrate may be homogeneously or surface grafted with a mixture of homogeneous grafting or surface grafting monomers, or may be grafted with a series of individually grafted surface grafting monomers and a similar series of homogeneously grafting monomers. The sequence of application generally is not important when a series of grafts are being applied. In general, a homogeneous and surface grafting monomer should be applied separately due to the fact the homogeneously grafting monomer generally acts as a swelling agent and if applied in admixture with a surface grafting monomer will cause the surface grafting monomer to be imbibed more or less homogeneously throughout the polymeric substrate.

A slightly different method by which the present invention may be carried out involves the use of peroxidic grafting sites for the second application of grafting monomer. For example, a first monomer may be grafted immediately after irradiation in order to make use of some of the free radical grafting sites induced by the irradiation. Subsequent to the first grafting step but before expiration of all the free radical sites, the irradiated polymer is exposed to oxygen for sufficient time to induce the formation of peroxidic sites is the substrate polymer. Exposure to air for about 1.0 to about 168 hours generally converts all the remaining irradiation induced free radical sites to peroxidic sites. The time required depends on the ease of penetration of air into the crystalline polymer. Subsequent to formation of the peroxidic sites the substrate polymer is contacted with the graftable monomer in the normal manner. The polymer will in turn graft to the peroxidic sites.

Crystalline substrate polymers which may be grafted in accordance with the present invention are crystalline polyethylene characterized by a density of at least 0.960; crystalline polypropylene characterized by having over 70% heptane insolubles; and highly crystalline polymers such as poly-4-methyl-1-pentene.

The high energy ionizing irradiation utilized from the present invention may be conveniently obtained from sources such as Van de Graaff generators, radioactive isotopes, and reactors. In general, the irradiation comprises high energy electrons having an energy of from 0.2 mev. to 5.0 mev., gamma rays, protons, alpha particles and neutrons.

Having generally described the basic aspects to the present invention the following specific examples are given to illustrate definite embodiments thereof.

EXAMPLE I

Polyethylene samples, density 0.95–0.96 having a reduced specific viscosity ($\eta_{sp./c.}$) equal to 2.30 and having a thickness of 30 mils were irradiated in an inert atmosphere of nitrogen to a 1 megarad dosage using 2 mev. electrons produced by a Van de Graaff electron accelerator. The samples were then heated in vinyl pyrrolidione monomer for 20 minutes at 80° C. to produce a surface graft. The samples were then washed with benzene and immersed in baths of different homogeneously grafting monomers (vinyl acetate, vinylpyridine and acrylonitrile) for 1 hour at 80° C. Subsequent to grafting the samples were washed with benzene and dried to constant weight. The results are tabulated in Table 1.

Table 1

| Monomer: | Percent graft |
|---|---|
| (1) Vinyl acetate | 1.2 |
| (2) Vinylpyridine | 22.6 |
| (3) Acrylonitrile | 2.7 |

In the above figures the amount of grafting produced by vinylpyrrolidone, which had been calculated to be 4.7±0.2% has been deducted. Examination of the grafted material under magnification indicates the vinylpyrrolidone graft in the above example extends about 1 mil beneath the surface of the substrate. The nature of the surface grafted structure is observed when the above surface grafted sheets are suspended in a vertical position and heated to 150° C. At this temperature the inner polymer melts and flows towards the bottom of the sheet. The exact thickness of the surface graft (which melts at a higher temperature) may then be conveniently determined. Furthermore, it is frequently found that solvent extraction of the inner homogeneous graft takes place which the surface graft remains relatively untouched. Such a procedure gives an alternative method for determining the thickness of the surface graft.

EXAMPLE II

Polyethylene having a $\eta_{sp./c.}$=2.30 and having a thickness of 30 mils was irradiated in an inert atmosphere to a 1 mr. dosage using 2 mev. electrons. The sample was then treated with a vinylpyrrolidone monomer for 20 minutes at 80° C. to obtain a surface graft thereon. The sample was washed with benzene to remove excess monomer and allowed to stand in air for four days to develop peroxidic grafting sites therein. Subsequently, the samples were subjected to a homogeneously grafting monomer for 1 hour at 80° C. The results are tabulated in Table 2.

Table 2

| Monomer: | Percent graft |
|---|---|
| (1) Vinyl acetate | 0.5 |
| (2) Vinylpyridine | 8.8 |
| (3) Acrylonitrile | 1.4 |

The above figures are corrected for the initial vinylpyrrolidone surface graft.

The above specific examples clearly illustrate that a succession of monomers may be grafted to a single polymeric substrate.

We claim:
1. A method for producing a surface grafted polymeric structure having a homogeneously grafted polymer therein which comprises irradiating in the absence of $O_2$ a polymeric substrate with high energy ionizing irradiation to produce initial activated grafting sites therein, contacting said substrate during the life of said initial activated sites with a homogeneously grafting monomer to produce a homogeneous graft throughout said substrate, exposing said grafted polymer to oxygen in the absence of irradiation to establish peroxidic grafting sites therein, and contacting said polymer with a different surface grafting monomer to produce a graft restricted to the surface of said substrate.

2. The method of claim 1 wherein the polymeric substrate is selected from the group consisting of crystalline polyethylene, crystalline polypropylene, and poly-4-methyl-1-pentene.

3. The method of claim 1 wherein the homogeneously grafted monomer is applied at a temperature of from 60 to 110° C.

4. The method of claim 1 wherein the high energy irradiation is applied in dosages ranging from 0.1 to 10.0 megarads.

5. The method of claim 1 wherein exposure to oxygen ranges from 1 to 168 hours.

6. The method of claim 1 wherein said surface grafting monomer is contacted with said initial activated grafting sites to produce a graft restricted to the surface of said substrate, and said homogeneously grafting monomer is contacted with said peroxidic grafting sites to produce a homogeneous graft throughout said substrate.

7. The method of claim 1 wherein said homogeneously grafting monomer is selected from the group consisting of acrylonitrile, 2-vinyl pyridine and vinyl acetate.

8. The method of claim 1 wherein said surface grafting monomer is selected from the group consisting of methyl acrylate, ethyl acrylate, ethyl methacrylate and vinyl pyrolidone.

(References on following page)

References Cited by the Examiner

UNITED STATES PATENTS

| | | | |
|---|---|---|---|
| 2,666,025 | 1/1954 | Nozaki | 204—159.16 |
| 2,983,657 | 5/1961 | Gabilly | 204—159.17 |
| 3,012,001 | 12/1961 | Smith | 204—159.17 |
| 3,088,791 | 5/1963 | Cline et al. | 204—159.15 |
| 3,137,674 | 6/1964 | Marans et al. | 204—159.17 |

OTHER REFERENCES

Martin, "Use of Radiation to Promote Chemical Reactions," Chem. & Eng. News, vol. 33, No. 14, pp. 1424–1428, April 4, 1955.

SAMUEL H. BLECH, *Primary Examiner.*

MURRAY TILLMAN, *Examiner.*

N. F. OBLON, R. B. TURER, *Assistant Examiners.*